United States Patent [19]
Robinson et al.

[11] Patent Number: 5,390,674
[45] Date of Patent: Feb. 21, 1995

[54] ULTRASONIC IMAGING SYSTEM WITH INTERPOLATED SCAN LINES

[75] Inventors: Brent S. Robinson, Kirdland; Clifford R. Cooley, Seattle; Juin-Jet Hwang, Mercer Island; Robert R. Entrekin, Bothell, all of Wash.

[73] Assignee: Advanced Technology Laboratories, Inc., Bothell, Wash.

[21] Appl. No.: 175,456

[22] Filed: Dec. 30, 1993

[51] Int. Cl.6 ............................................. A61B 8/00
[52] U.S. Cl. ............................ 128/660.07; 73/625
[58] Field of Search ................. 128/660.07, 661.01; 73/625–626; 382/44

[56] References Cited

U.S. PATENT DOCUMENTS

| | | | |
|---|---|---|---|
| 4,448,201 | 5/1984 | Matsumoto | 358/112 |
| 4,468,747 | 8/1984 | Leavitt et al. | 364/577 |
| 4,549,210 | 10/1985 | Dulapa | 358/112 |
| 4,644,795 | 2/1987 | Augustine | 73/625 |
| 4,930,514 | 6/1990 | Baba et al. | 128/661.09 |
| 5,088,496 | 2/1992 | Bernard | 128/660.07 |
| 5,197,037 | 3/1993 | Leavitt | 128/661.01 X |
| 5,249,578 | 10/1993 | Karp et al. | 128/661.01 |
| 5,268,877 | 12/1993 | Odell | 128/661.01 X |

*Primary Examiner*—Francis Jaworski
*Attorney, Agent, or Firm*—W. Brinton Yorks, Jr.

[57] ABSTRACT

An ultrasonic diagnostic imaging system is provided which scans an image region to receive a plurality of spatially arranged lines of ultrasonic image information signals. These ultrasonic line information signals are used in an interpolater to interpolate one or more lines which are spatially interlineated between each pair of spatially adjoining received lines. These interpolated lines are produced using either the received RF or demodulated IF ultrasonic image information signals. The interpolated lines are produced prior to scan conversion, and preferably prior to nonlinear processing such as detection or log compression to reduce spatial aliasing artifacts. In one preferred embodiment the interpolater comprises a transversal filter of four taps which is responsive to received line information signals from a common range or depth. In a second embodiment the interpolater is adaptively responsive to motion to select samples for interpolation which would be spatially at the same range in the absence of motional effects.

21 Claims, 6 Drawing Sheets

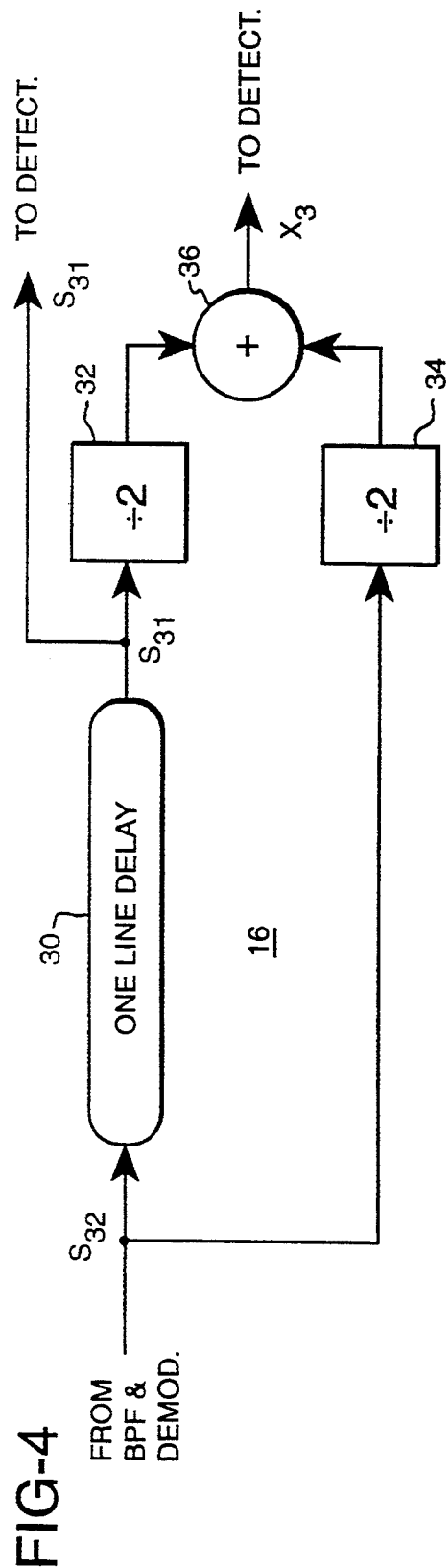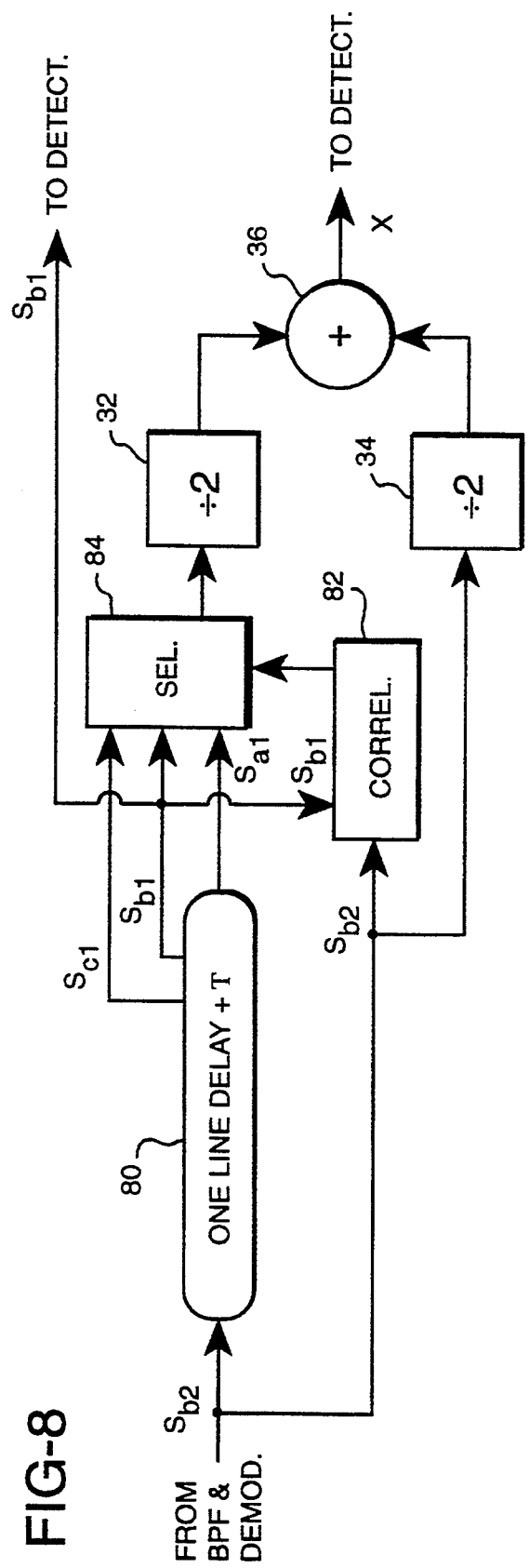

ULTRASONIC IMAGING SYSTEM WITH INTERPOLATED SCAN LINES

This invention relates to ultrasonic diagnostic imaging systems which scan the body by a plurality of scan lines received over an image plane or volume and, in particular, to the creation of additional image lines through interpolation prior to scan conversion.

Ultrasonic diagnostic imaging systems create images of planes or three dimensional spaces within a body by transmitting ultrasonic waves into the body and receiving echoes returned from along various directional vectors or lines. As the lines of echoes are received the spatial locations from which they were reflected are either measured or computed and stored along with the echo information. The echo information is received at the frequencies of the transmitted ultrasonic waves (RF frequencies). The received RF echo information is conventionally amplified, demodulated to an intermediate frequency (IF) range, detected and further processed to provide a line of echo information at detected baseband frequencies.

The lines of echo information may be received in a number of spatial formats. The lines may be arranged in a wedge-shaped sector format, in which the lines converge at a common point or region at the receiver and diverge as they extend to greater depths within the body. If the lines do not fully converge to a point at the receiver the sector format can have a trapezoidal appearance. If the receiving transducer is curved, the small side of the trapezoid can appear curved. The wedge shape can be extended over a 180° angle, giving the sector format the shape of a semicircle. Another common spatial format is the linear format, in which the lines are oriented parallel to each other over the image plane. These planar formats may be extended into a third dimension to project a volumetric image.

Since the image is conventionally displayed on a video monitor it is necessary to convert the spatial format of the image plane, whatever its shape or line arrangement, to an arrangement of parallel lines which can be scanned onto a raster display. The lines of echo information are stored in a storage medium by using their spatial locational data to store the lines in the medium in their proper spatial orientations to each other. The fully assembled image plane can be read out of the storage medium in horizontal lines for scanning onto a video display monitor. Hence, the storage medium which assembles the image plane and reads it out in a video format is referred to as a scan converter, since the format of the ultrasonic scan lines in the body are converted into a format suitable for image display.

As the image is assembled line by line in the scan converter storage medium, the interline spacing and its relation to the resolution of the display becomes readily apparent. Often the result will be that storage locations between adjacent lines will be empty due to the spatial spread of the lines of echo information. This is particularly the case with a sector format, in which the lines of echo information increasingly diverge in the far field. To improve the appearance of the displayed image, the storage areas between the lines are filled in with calculated interline display values. Usually the calculated values are computed through various interpolation techniques. This process of filling in the voids between (and sometimes even along) the lines of echo information is variously referred to as image smoothing or hole filling.

However, by the time the lines of echo information are presented to the scan converter, a distortional effect, or aberration, has often been introduced into the image information. This aberration is due to the increase in frequency content resulting from nonlinear processing of the echo information signals, such as log compression or detection. This frequency content increase can often exceed the Nyquist limit of the spatial sampling rate, resulting in aliasing of the echo information signals. The aberration becomes especially noticeable when the ultrasonic probe is moved relative to the body being scanned. During such movement the artifact will give the image a scintillating appearance.

In accordance with the principles of the present invention additional lines of echo information are created intermediate to the received lines prior to nonlinear processing and scan conversion of the echo information signals. The additional lines are calculated from the received line information, preferably by interpolation. In one preferred embodiment the additional line data is calculated from spatially lateral echo information points (i.e. points at the same range from the receiver). In another preferred embodiment motion of or within the image is sensed and the relative axial displacement of the lateral interpolation points is adaptively adjusted to reduce effects of motional distortion.

In the drawings:

FIG. 4 illustrates the line interpolater of FIG. 1 in greater detail;

FIG. 8 illustrates in block diagram form the details of an adaptive line interpolater.

Figure 1:
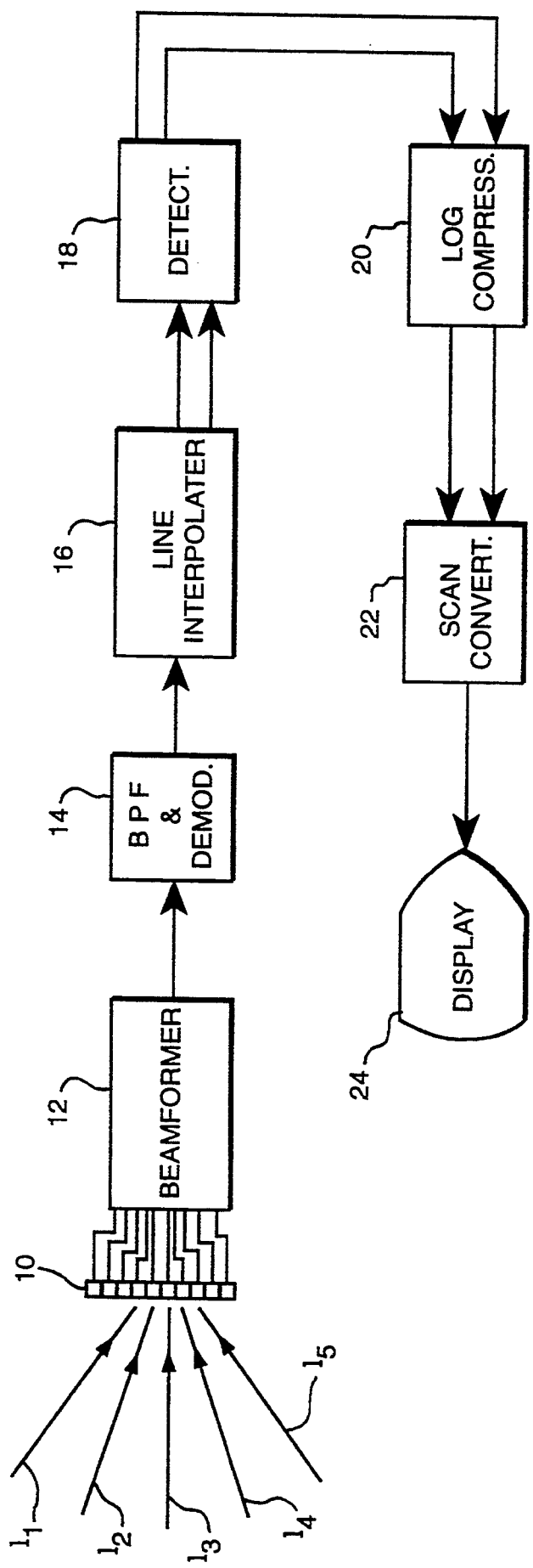
FIG. 1 is a block diagram of an ultrasonic imaging system constructed in accordance with the principles of the present invention.

Referring first to FIG. 1, an ultrasonic imaging system constructed in accordance with the principles of the present invention is shown in block diagram form. An array 10 of transducer elements is activated by a beamformer 12 to transmit waves of ultrasonic energy into a body located adjacent to the transducer array 10. Ultrasonic echoes are reflected from particles and interfaces within the body and return along paths shown as lines 11, 12, 13, and so forth. Generally this transmission and reception is line sequential. A beam of ultrasonic energy is first sent out in the direction of line 11, which results in a return of echoes along the direction of line 11. Next, a beam of ultrasonic energy is transmitted along line 12 resulting in a return of echoes from the direction of line 12. The body adjacent to the transducer 10 is scanned in this manner until the number of lines of coverage desired for the image plane area to be displayed have been gathered.

The beamformer 12 receives the echo components returned following each transmission of ultrasonic energy and delays and combines the echo components as is known in the art to form a coherent sequence of echo information which returned from the direction of the scan line. As is well known, the beamformer 12 is used to focus and steer the transmitted beams of ultrasound and to combine and focus the received echo components of an array transducer to form a coherent line of echo information.

The sequentially received and formed lines of echoes are then processed by a band pass filter and demodulator 14. Band pass filtering narrows and shapes the pass band of frequencies occupied by the echo signal and demodulation translates the received high frequency echo signals to an intermediate band or baseband of frequencies where they can be processed more efficiently and simply.

In accordance with the principles of the present invention, the lines of received echo information are used to form spatially intermediate lines through interpolation by line interpolater 16. The line interpolater 16 can store all the lines of one complete sweep of lines (frame) over the area to be imaged, then the lines of echo information are used to calculate an interpolated line between adjacent line pair. However, to obviate the need to store a full frame of lines it is possible to compute interpolated lines as the line data is received. One way of doing this is shown in FIG. 4. The signals from the currently received line from the bandpass filter and demodulator 14 are applied to the input of a delay line 30 with a delay of one line cycle (where a line cycle is the total of both the transmit and receive periods as well as any periods therebetween.) In this example the currently received line signal is identified as $S_{32}$. The delay line 30 could be an analog delay line, a CCD delay line (for a sampled analog system), or a shift register (for a digital system). The currently received line signals are also applied to the input of a divide by two circuit 34. At the same time a signal from the same point (in time or distance) of the previously received line, $S_{31}$, appears at the output of the one line delay 30 and is applied to the input of a second divide by two circuit 32. The weighted signals at the outputs of the divide by two circuits are applied to a summer 36 where they are combined to form an interpolated echo information signal $X_3$, which is available for detection, as is one of the actually received lines of echoes signals, either at the output of the delay line as shown as $S_{31}$, or the currently received line signal $S_{32}$.

The echo information signals $S_{31}$ and $S_{32}$ on each line are accompanied by data which provides their spatial coordinates, so that a spatial image can be properly assembled. In the same manner as the arrangement of FIG. 4 interpolates to compute a signal value, the spatial coordinates of the two lines are used to compute an intermediate spatial location representing the location of the interpolated signal value $X_3$ in the image field. In the case of FIG. 4, where the interpolated signal is computed by weighting each line value by one-half, the location of the interpolated line signal will be computed to be halfway between the two received lines. When the relative interpolation weighting is changed to other proportions, the location of the interpolated line signal will likewise be proportionally changed.

Figure 5:
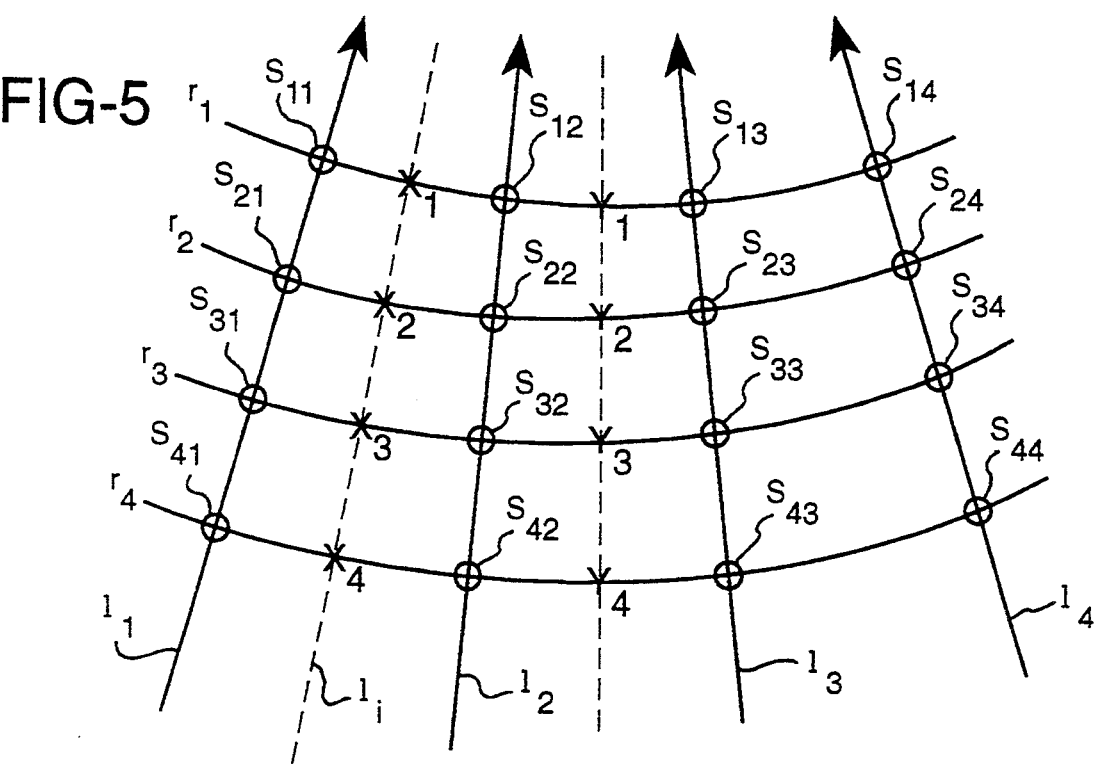
FIG. 5 illustrates the interpolation of scan lines between the received scan lines of a sector scanned image.

The effect of the foregoing line interpolation technique is shown in FIG. 5. In this figure an ultrasonic wave has been transmitted along line $l_1$ and echoes returned from along the line in the direction indicated by the arrowhead on the line. The echoes sequentially return from points $S_{11}$, $S_{21}$, $S_{31}$ and $S_{41}$ along the line $l_1$. These points are at distances $r_1$, $r_2$, $r_3$, and $r_4$ from the transducer, respectively. Since these distances are along the line they are referred to as indicators of axial direction. As echoes are received from along line $l_1$ at points $S_{11}$, $S_{21}$, $S_{31}$ and $S_{41}$ they are applied to the one line delay 30.

Echoes are then received from along the adjacent line, line $l_2$. As these echoes are received the $l_1$ echoes from the same spatial distances "r" appear at the output of the delay line 30. Thus, echoes from point $S_{12}$ of the second line will be received as echoes from point $S_{11}$ appear at the output of the delay line. The two echoes are averaged (divided by two and summed) to compute the value of echoes at point $X_1$ of the interpolated line $l_i$.

Similarly, echoes are progressively received from along line $l_2$ including sequential points $S_{22}$, $S_{32}$ and $S_{42}$. These echoes are used with the concurrently produced echoes from the same axial distances along line $l_1$ to compute a sequence of interpolated echoes including those at points $X_2$, $X_3$, and $X_4$ along the intermediate interpolated line $l_i$. The interpolator 16 of FIG. 4 is shown at the moment that signal $S_{32}$ is applied to the input of the one line delay 30 in synchronism with the production of signal $S_{31}$ at the output to produce interpolated signal $X_3$.

The interpolated line echo information is treated in the same manner as the echo information of the actually received lines in the formation of an image in the arrangement of FIG. 1. The echo information is detected by a detector 18, then scaled in dynamic range by log compression circuit 20. (Two lines are shown in the signal path following the line interpolater 16 to denote the use of both received and interpolated line information.) The echo information is then locationally stored in the storage medium of a scan converter 22, enabling the sector scan to be displayed on the screen of a video display 24.

Figure 2A:
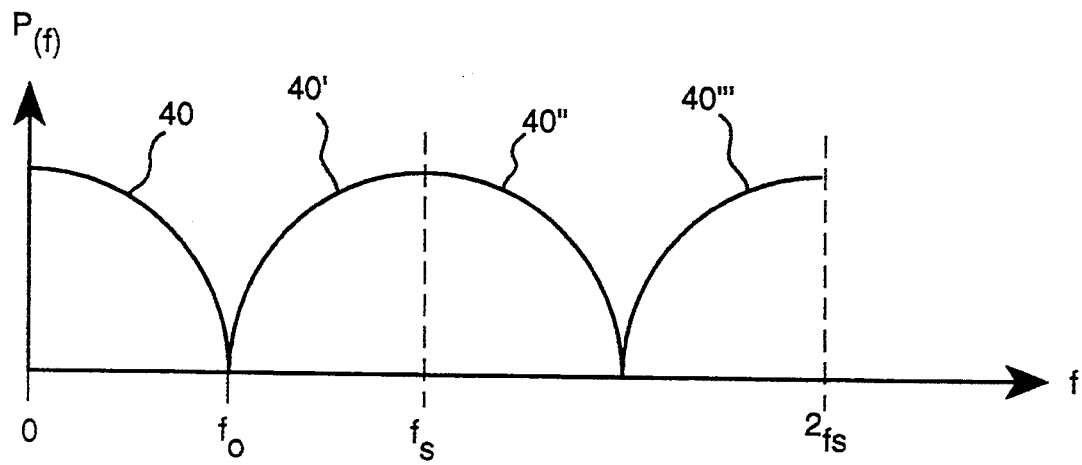
FIGS. 2a, 2b, 3a and 3b are graphical representations of the spectra of ultrasound signals before and after nonlinear processing.
Figure 2B:
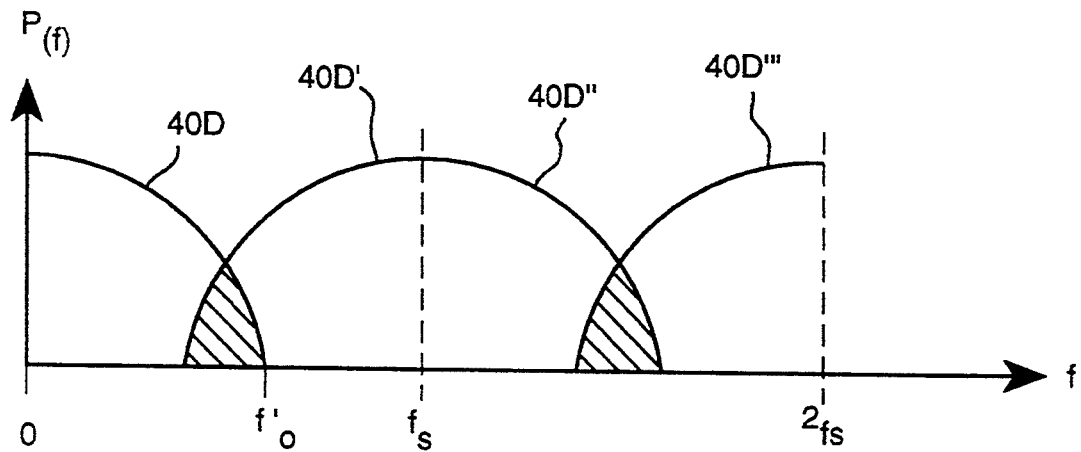

The manner in which this interpolated line technique diminishes the disturbing aberration of scintillation is explained with reference to the graphs of FIGS. 2 and 3. Curve 40 represents the extent of the baseband spectrum of the received RF ultrasonic echo information with a line density in the lateral (azimuth) direction of an ultrasound image which spatially samples the subject at a spatial sampling frequency of $f_s$. In FIG. 2a this spatial sampling frequency $f_s$ has been chosen to be twice the highest frequency of the information spectrum, $f_o$, in satisfaction of the Nyquist criterion. The choice of the spatial sampling frequency $f_s$ for the spectrum extending to frequency $f_o$ will result in a continuum of nonoverlapping spectra 40', 40", and 40"' around multiples of the sampling frequency as shown in FIG. 2a. As long as the signals of these spectra are not processed nonlinearly, no scintillation artifacts will develop.

Suppose that the RF signals undergo detection before being displayed, a nonlinear operation. The detection process will create additional spectral components, extending the spectrum 40 to the greater spectrum illustrated by 40D in FIG. 2b. With the same spatial sampling frequency $f_s$ the greater spectra resulting from sampling will now overlap, as indicted by the crosshatched areas in FIG. 2b. The spectral components of one spectrum will vectorially combine with the spectral components of the overlapping spectrum to form new, randomized vectorial spectral components. These randomized spectral components recur at each crosshatched overlap area and manifest themselves in an image as scintillation effects as the object field moves in relation to the transducer 10.

Figure 3A:
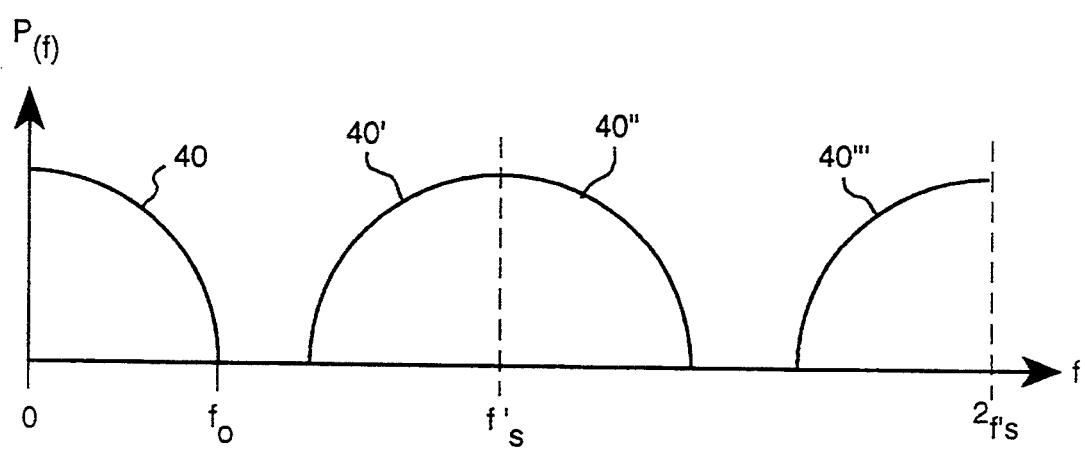
Figure 3B:
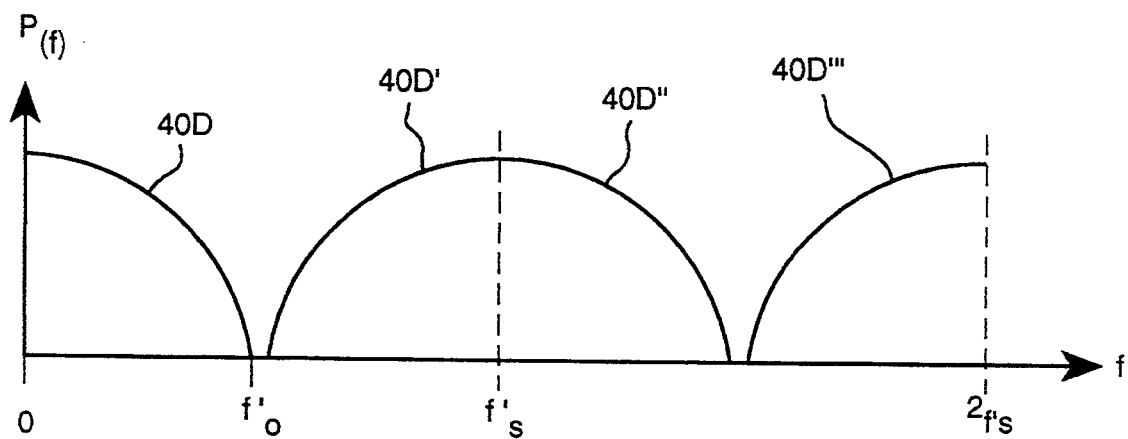

The creation of additional scan lines through interpolation increases the line density and effectively increases the spatial sampling frequency to a higher value $f_s'$ as shown in FIG. 3a. The same spectra 40, 40', 40" and 40'" are obtained, but the higher spatial sampling frequency $f_s'$ creates separations between the spectra as shown. Now if the signal in the spectra are subjected to detection, the spectra will be extended to 40D, 40D', 40D", and 40D'" as shown in FIG. 3b, but the interspectra spacing resulting from the higher spatial sampling frequency enables the Nyquist criterion for the spectra to continue to be satisfied. The signals are processed nonlinearly by detection, but since there is no spectra overlap and creation of randomized signals, no scintillation artifacts are produced.

Figure 6:
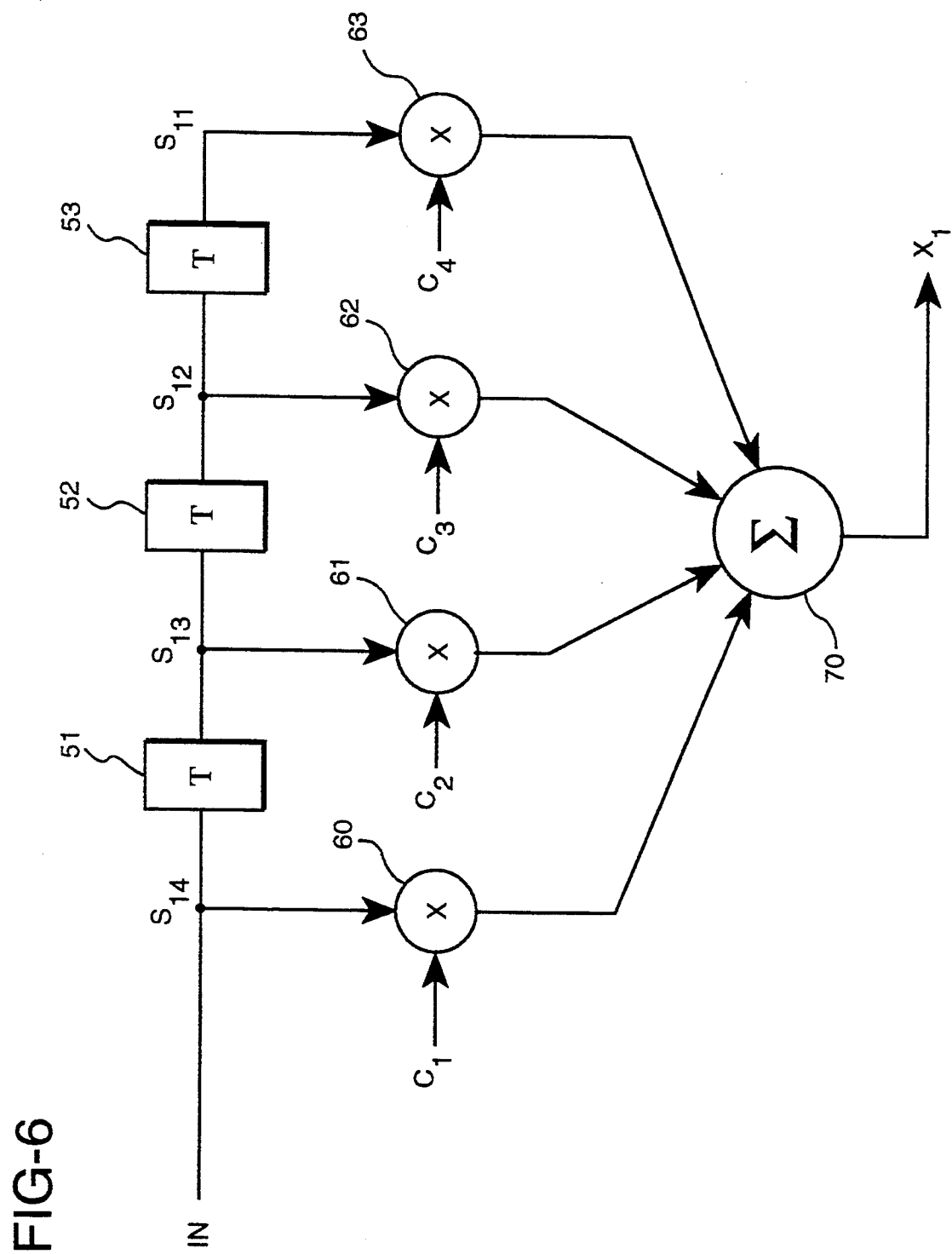
FIG. 6 illustrates an embodiment of the line interpolater of the present invention as a four tap filter.

FIG. 6 illustrates a preferred line interpolater for a sampled data or digital ultrasound embodiment. This line interpolater is a four tap linear filter. The linear filter can be constructed as either an infinite impulse response (IIR) filter or as a finite impulse response (FIR or transversal) filter, and in the embodiment of FIG. 6 a transversal filter is shown. At least three lines of received ultrasonic signals are stored, enabling the transversal filter to operate upon samples of four lines at one time. The samples from the four lines, such as lines $l_1$, $l_2$, $l_3$ and $l_4$ of FIG. 5 are applied sequentially to the input of the filter and shifted or transferred in until they are separated by respective line delay times Tau by delay elements 51, 52, and 53. The example of FIG. 6 shows the samples from range $r_1$ of FIG. 5 separated by delay elements 51-53. The samples are multiplied by filter coefficients $C_1$-$C_4$ in multipliers 60-63 and the results are summed in summer 70 to produce the interpolated result $Y_1$ of a line which, in the preferred embodiment, is spatially centered in the middle of the four lines $l_1$-$l_4$. Other spatial locations for the "Y" line may also be obtained through choice of the filter coefficients.

There are a variety of ways to operate the transversal filter. If the full field of ultrasonic signals is received and stored, the filter can traverse the entire lateral $r_1$ range by sequentially shifting in successive samples. For instance, after $Y_1$ is computed for line $l_i$, the sample $S_{15}$ from the fifth line $l_5$ (not shown) is shifted in to compute the value for the interpolated line between lines $l_3$ and $l_4$ at range $r_1$. After all interpolated values at range $r_1$ have been computed the samples at the next range $r_2$ are applied to the transversal filter to compute the next value in each interpolated line, including value $Y_2$ in the "Y" line. Alternatively, if only four lines are available at one time, the filter would compute $Y_1$, then $Y_2$, then $Y_3$, and so forth until all values for the "Y" line have been computed in axial succession.

It is also possible to compute a number of interpolated lines between every pair of received lines. For instance, after computing value $Y_1$ the coefficients $C_1$-$C_4$ of the filter could be changed, while retaining the same values at the delay element outputs, to compute a value between $Y_1$ and $S_{12}$. Still keeping the sample values at the delay element outputs and changing the filter coefficients again, an interpolated value is computed between $S_{13}$ and $Y_1$. Thus, three interpolated lines are computed in this manner between every pair of received lines, resulting in a four-fold increase in line density. A higher speed technique to achieve this result is to operate three filters in parallel. Each filter is structurally identical to the other two, differing only in filter coefficients used.

Once the four samples from the four lines are available for processing, the three parallel filters would compute three interpolated line values simultaneously.

For a system employing the transversal filter of FIG. 6 for the line interpolater 16 of FIG. 1, the bandpass filter of the bandpass filter and demodulator 14 could also be configured as a transversal filter, but operating on samples in the axial direction. For example, a twelve tap filter could be employed, through which the samples of the entire line are passed in sequence to filter the line data. While the line interpolater 16 can be located either before or after the bandpass filter and demodulator 14, in this instance it would be operationally simpler to have the line interpolater 16 follow the bandpass filter. This would obviate the need to run the samples of the interpolated lines through the bandpass filter, since the interpolater would be operating upon bandpass filtered data.

Figure 7:
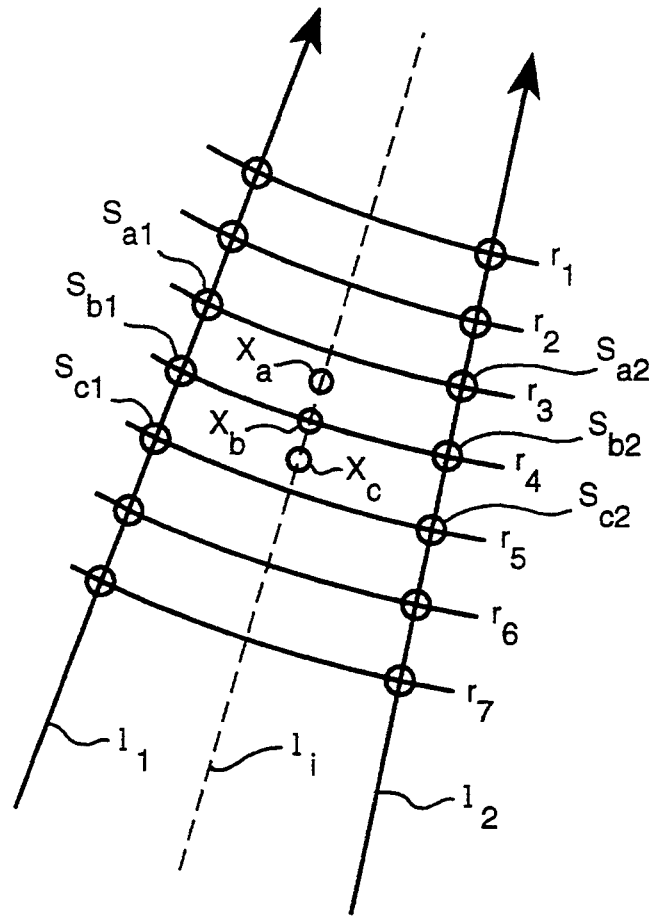
FIG. 7 illustrates the axially adaptive interpolation of a scan line between two received scan lines of a sector scanned image to reduce motional effects.

The use of a line interpolater in accordance with the present invention can introduce erroneous results into the interpolated line values if the subject is moving relative to the transducer while the line data is acquired. Motion can result in the use of shifted adjacent samples in the computation of the interpolated lines. FIGS. 7 and 8 illustrate an adaptive system which compensates for the effects of motion in the axial direction. In FIG. 8 the samples from consecutive received lines are transferred through a delay line 80 which is one line cycle plus one sample period Tau in length. For the sample sequence shown for lines $l_1$ and $l_2$ in FIG. 7, sample $S_{b2}$ of line $l_2$ is applied to the input of the delay line 80 at the same time as sample $S_{a1}$ is produced at the output of the delay line. The delay line has two taps, separated from the output by one sample period and two sample periods, respectively, at which samples $S_{b1}$ and $S_{c1}$ are produced at the time that sample $S_{a1}$ appears at the output of the delay line.

A number of samples from the two lines $l_1$ and $l_2$, taken from the input and the first tap of the delay line, respectively, are applied to a correlator 82. The correlator performs a cross-correlation of range aligned data samples of the two lines $l_1$ and $l_2$ to detect the condition of relative motion between the two lines. This cross correlation is performed in the conventional manner by sequentially shifting sample sequences from the two lines relative to each other, multiplying aligned samples after each shift, and summing the products to produce a correlation factor. The value and direction of shift for which the correlation factor is at a maximum indicates the amount and direction of motion that has occurred in the period between the acquisition of the two lines $l_1$ and $l_2$. The peak of the correlation factor is then used as the control input of a selector or multiplexer 84 to select the sample at the input of the selector which would, in the absence of motion, be range-aligned with the sample at the input of the delay line 80.

Thus, when sample $S_{b2}$ of line $l_2$ is at the input of the delay line and there is no motion when the line samples are acquired, there would be a high degree of correlation between the two lines when no relative shift occurred, indicating no motion. The selector 84 would then select sample $S_{b1}$ to be used in calculating an interpolated value $X_b$ with sample $S_{b2}$ at the output of summer 36. As shown in FIG. 7, these two samples are at the same range $r_4$ in this example.

But when there is motion away from the receiver (in a direction opposite that of the arrowheads in FIG. 7), the correlator 82 will detect the motion and its direction. In the example the selector 84 would select sample $S_{a1}$ to be used in interpolation with sample $S_{b2}$. An interpolated value $X_a$ is then computed at the output of summer 36 using these two sample values. By virtue of the motion, the value $X_a$ is seen to be at a half range increment between ranges $r_3$ and $r_4$ in FIG. 7.

In a similar manner motion toward the receiver would be detected by the correlator 82 and sample $S_{c1}$ would be selected to be used with sample $S_{b2}$ to interpolate value $X_c$, again at a range half increment due to motion.

The interpolated values may be at fractional range increments as the foregoing example illustrates. To bring the samples back into alignment with the same ranges as the received lines, the interpolated line values can be processed through an axial transversal filter with coefficients chosen to compute an interpolated value at each whole range increment along the interpolated line. This alignment would be useful if further line filtering were to be done using a multitap filter, for instance, or if the scan converter requires sample data points to be spatially organized in a uniform grid or pattern.

While the embodiment of FIG. 8 adapts the interpolater to account for axial motion, it will be apparent that an adaptive technique can be employed to account for motion in the lateral direction also. A correlation can be performed laterally across the aperture using the signal values at two adjacent r distances. If lateral motion is detected, the values of affected signal samples can be adjusted by a weighting or interpolative technique in consideration of the values of adjacent signal samples. Thus it is possible to employ the interpolative techniques of the present invention with a high degree of immunity to motional effects.

One skilled in the art will recognize that techniques other than correlation may be used to detect relative motion to be used for interpolation adjustment. For instance, U.S. Patent application Ser. No. 795,604, filed Nov. 21, 1991, describes a transducer assembly which includes accelerometers used for detecting motion of the transducer. U.S. Pat. No. 5,127,409 describes a Doppler technique for sensing transducer motion. These and other techniques may be used to provide a selection signal for control of an interpolater in accordance with the principles of the embodiment of FIG. 8.

While the increase in line density achieved by line interpolation is employed in the foregoing examples to reduce scintillation artifact effects, advantage can be taken of the Line density for other purposes. For instance, fewer received lines need to be acquired to create a frame of significantly greater line density when additional lines are interpolated. The time required to assemble all of the lines necessary to create a full image frame is reduced by the difference between the time that would have been required to transmit ultrasonic waves and receive echoes for the additional lines, and the time actually utilized to interpolate the lines. This results in a decrease in the amount of time required to form a complete frame and a consequent increase in the frame rate. Thus, line interpolation can be used where an increase in the image frame rate is useful or required. Stated another way, when the frame rate of realtime imaging drops to unacceptably low levels, the replacement of scanned lines with more quickly formed interpolated lines can boost the frame rate back to acceptable levels. Alternatively, a frame may be computed in a relatively short time through line interpolation, and the time savings used to perform other image enhancements, such as frame averaging, speckle reduction or elimination of other artifacts.

The principles of the present invention may be used to improve Doppler scanning as well as B mode imaging. In two dimensional Doppler scanning for flow imaging, an ensemble of lines are acquired at different times in the same direction. The data from the lines of the ensemble are used to compute Doppler velocities of flow at points along the direction of the ensemble, and a plurality of spatially adjacent ensembles can be used to depict flow throughout an entire image field. The time required to compile flow data for a full image may be reduced by interpolating line ensembles intermediate to actually scanned ensembles. For example, assume that each spatial line location $l_1$–$l_4$ in FIG. 5 comprised an ensemble of eight lines acquired over time. Interlineated interpolated ensembles at the "X" and "Y" line locations can be formed by interpolating the first lines (in time) of adjacent scanned ensembles to compute the first scan line of the intermediate interpolated ensemble. The second lines (in time) of the scanned ensembles are then used to compute the second line of the interpolated ensemble, and so forth until an entire interpolated ensemble is formed. The interpolated ensembles are Doppler processed in the same manner as the scanned ensembles to depict flow in the image field.

What is claimed is:

1. An ultrasonic diagnostic imaging system with reduced susceptibility to spatial aliasing comprising:
   means for transmitting ultrasonic waves into a region of a subject to be imaged;
   means for receiving ultrasonic information signals from along a plurality of spatial lines of said region;
   interpolation means for utilizing said received ultrasonic line information signals to produce a plurality of interpolated lines spatially interlineated between said received ultrasonic lines prior to nonlinear processing of said ultrasonic line information signals; and
   scan conversion means for utilizing said received and interlineated interpolated line information to form a spatially arranged ultrasonic image of said region of said subject.

2. The ultrasonic diagnostic imaging system of claim 1, wherein said interpolation means comprises a filter responsive to a plurality of laterally aligned signals of said received ultrasonic line information signals.

3. The ultrasonic diagnostic imaging system of claim 2, wherein said filter comprises a linear filter.

4. The ultrasonic diagnostic imaging system of claim 3, wherein said filter comprises a transversal filter.

5. The ultrasonic diagnostic imaging system of claim 4, wherein said filter has four or more taps.

6. An ultrasonic diagnostic imaging system with reduced susceptibility to spatial aliasing comprising:
   means for transmitting ultrasonic waves into a region of a subject to be imaged;
   means for receiving ultrasonic information signals from along a plurality of spatial lines of said region;
   interpolation means for utilizing said received ultrasonic line information signals to produce a plurality of interpolated lines spatially interlineated between said received ultrasonic lines prior to nonlinear processing of said ultrasonic line information signals; and
   scan conversion means for utilizing said received and interlineated interpolated line information to form a spatially arranged ultrasonic image of said region of said subject;

wherein said interpolation means comprises a filter responsive to a plurality of laterally aligned signals of said received ultrasonic line information signals; and wherein said filter computes a plurality of interpolated lines spatially between each pair of received spatial lines.

7. An ultrasonic diagnostic imaging system with reduced susceptibility to spatial aliasing comprising:

means for transmitting ultrasonic waves into a region of a subject to be imaged;

means for receiving ultrasonic information signals from along a plurality of spatial lines of said region;

interpolating means for utilizing said received ultrasonic line information signals to produce a plurality of interpolated lines spatially interlineated between said received ultrasonic lines prior to nonlinear processing of said ultrasonic line information signals;

means, responsive to said received and interpolated ultrasonic line information signals, for processing said received and interpolated ultrasonic line information signals nonlinearly; and scan conversion means for utilizing said nonlinearly processed ultrasonic line information signals to form a spatially arranged ultrasonic image of said region of said subject.

8. The ultrasonic diagnostic imaging system of claim 7, wherein interpolating means utilizes received RF ultrasonic line information signals.

9. The ultrasonic diagnostic imaging system of claim 7, further comprising demodulation means, responsive to said received ultrasonic line information signals, for producing intermediate frequency ultrasonic line information signals; and wherein said interpolating means utilizes said intermediate frequency ultrasonic line information signals to interpolate a plurality of spatially interlineated interpolated lines prior to nonlinear processing of said ultrasonic line information signals.

10. The ultrasonic diagnostic imaging system of claim 7, wherein said nonlinearly processing means comprises a detector.

11. The ultrasonic diagnostic imaging system of claim 10, wherein said nonlinearly processing means further comprises a compression circuit.

12. The ultrasonic diagnostic imaging system of claim 11, wherein said compression circuit rescales the amplitudes of time domain signals.

13. The ultrasonic diagnostic imaging system of claim 12, wherein said compression circuit comprises a log compression circuit.

14. An ultrasonic diagnostic imaging system with reduced susceptibility to spatial aliasing comprising:

means for transmitting ultrasonic waves into a region of a subject to be imaged;

means for receiving ultrasonic information signals from along a plurality of spatial lines of said region;

interpolating means for utilizing said received ultrasonic line information signals to produce a plurality of spatially interlineated interpolated lines spatially interlineated between said received ultrasonic lines prior to nonlinear processing of said ultrasonic line information signals;

means, responsive to said received and interpolated ultrasonic line information signals, for processing said received and interpolated ultrasonic line information signals nonlinearly;

scan conversion means for utilizing said nonlinearly processed ultrasonic line information signals to form a spatially arranged ultrasonic image of said region of said subject; and demodulation means, responsive to said received ultrasonic line information signals, for producing baseband ultrasonic line information signals; and wherein said interpolating means utilizes said baseband ultrasonic line information signals to interpolate a plurality of spatially interlineated interpolated lines prior to nonlinear processing of said ultrasonic line information signals.

15. An ultrasonic diagnostic imaging system comprising:

means for transmitting ultrasonic waves into a region of a subject to be imaged;

means for receiving ultrasonic information signals from along a plurality of spatial lines of said region;

interpolating means for utilizing said received ultrasonic line information signals to produce a plurality of interpolated lines spatially interlineated between said received ultrasonic lines; and means for utilizing said received and interpolated ultrasonic line information signals to form a spatially arranged ultrasonic image of said region of said subject, wherein said interpolating means further includes means for sensing the occurrence of relative motion during the reception of said received ultrasonic line information signals, and means for varying said interpolating in response to the sensing of the occurrence of relative motion.

16. The ultrasonic diagnostic imaging system of claim 15, wherein said sensing means senses the occurrence of relative axial motion in the image field between the time of acquisition of one received line and the time of acquisition of another received line.

17. The ultrasonic diagnostic imaging system of claim 16, wherein said varying means varies the axial range of the ultrasonic line information signals used to interpolate a spatially interlineated line.

18. The ultrasonic diagnostic imaging system of claim 15, wherein said sensing means senses the occurrence of relative lateral motion in the image field between the time of acquisition of one received line and the time of acquisition of another received line.

19. An ultrasonic diagnostic imaging system comprising:

means for transmitting ultrasonic waves into a region of a subject to be imaged;

means for receiving ultrasonic information signals from along a plurality of spatial lines of said region, wherein ensembles of said lines each are received at different times from a common direction;

interpolating means for utilizing said received ultrasonic line information signals from two or more ensembles which have not been subjected to nonlinear processing to produce one or more interpolated ensembles of corresponding lines spatially interlineated between said received ultrasonic lines; and means for producing information concerning said subject through Doppler processing of said received and interpolated ultrasonic line ensembles.

20. The ultrasonic diagnostic imaging system of claim 19, wherein said receiving means further comprises means for receiving a plurality of ensembles of lines, each of which comprises lines received in a given time sequence; and wherein said interpolating means comprises means for producing an ensemble of interpolated lines of a time sequence corresponding to said given time sequence.

21. The ultrasonic diagnostic imaging system of claim 20 wherein said interpolating means further comprises means for producing one of said lines of said interpolated ensemble having a given position in said time sequence by using received lines having corresponding positions in the time sequences of said received line ensembles.

* * * * *